United States Patent [19]

Teel

[11] Patent Number: 4,972,385

[45] Date of Patent: Nov. 20, 1990

[54] TARGET SIZE CLASSIFICATION SYSTEM

[75] Inventor: Willis A. Teel, Panama City, Fla.

[73] Assignee: The United States of America, as represented by the Secretary of the Navy, Washington, D.C.

[21] Appl. No.: 90,156

[22] Filed: Nov. 16, 1970

[51] Int. Cl.⁵ ............................................. G01S 15/08
[52] U.S. Cl. ..................................................... 367/99
[58] Field of Search .................. 340/1 R, 3 D, 3 FM, 340/3 R; 343/55 A; 367/99, 87, 107

[56] References Cited

U.S. PATENT DOCUMENTS 3,119,999  1/1964  Jaffe ........................................ 367/87
3,150,363  9/1964  Finvold .................................. 342/192
3,512,124  5/1970  Watson ................................... 367/107
3,603,919  9/1971  Moore .................................... 367/101

Primary Examiner—Thomas H. Tarcza
Assistant Examiner—Daniel T. Pihulic
Attorney, Agent, or Firm—Harvet David; John Becker; Sol Sheinbein

[57] ABSTRACT

A sonar system is disclosed having signal analyzing circuitry rendering the system responsive to objects of a predetermined size. The signal analysis is accomplished by a spectral analysis of the echo signals returned from the objects. In particular, the relative height of adjacent side lobes of echo signals energy returned to the sonar are compared to indicate the size of the object reflecting the signal.

8 Claims, 4 Drawing Sheets

TARGET SIZE CLASSIFICATION SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of echo ranging and, more particularly, the invention pertains to a method and means of target classification. The invention will be described as it pertains to the underwater acoustic ranging art in which it was conceived. However, as will become apparent as the invention is more fully disclosed herein, other fields of echo ranging may benefit from the invention as greatly as the acoustic ranging arts.

DESCRIPTION OF THE PRIOR ART

In search type investigation, a great deal of time is spent in observing the indicator readout scope of the search sonar for targets of interest. Indication on the scope, of course, vary in intensity and size in accordance with the targets reflecting the energy. Prior art target classification relied on accurate interpretation of the signal amplitude, i.e., brightness, and its size. To determine if the target is of interest to the searching personnel, determinations must be made on each target presented. This task is complicated by physiological responses of the operating personnel; that is, bright objects tend to register as larger objects while less bright objects appear smaller. Although a skillful, experienced operator can classify target returns quite accurately when he is rested, as his watch wears on, he becomes fatigued. The continum of targets displayed from irregularities on the bottom, marine life, and other returns causes the operator to make thousands of classification decisions, many subconsciously, during a relatively short time.

On a relatively small ship, such as a minesweeper or salvage vessel, long or frequent watches are necessitated by limited crew complement. The fatigue introduced by long hours of close attention to a clutter-filled indicator scope increases the likelihood that operating personnel will make errors of identification. Such errors are likely, to prove extremely costly of human and economic resources.

If an operator could be freed from focusing his undivided attention on his indicator scope and could be alerted when the indicator scope has a target displayed thereon, the length of the watches could be increased without sacrificing accuracy. The resulting saving of personnel and the increased accuracy afforded by such a system would be a significant advance in the echo ranging arts. Two approaches promise improvements in this critical area.

One approach is to eliminate all targets except for those of a predetermined size from the target display. In this manner the operator would have to make decisions concerning only a small percentage of the target signals actually received. This tends to make brightness and shape more useful in target classification.

A system having an audio indication denoting when signals of the predetermined desired type are received is another desirable solution to the deficiencies inherent in the prior operational arrangements. Prior attempts to produce such alarms have not been successful because of inabilities to differentiate between random signals attributable to marine life and other operational phenomena and the predetermined signals. Thus, prior art audio alarms tended to be easily triggered by shape and brightness to provide false indication.

SUMMARY OF THE INVENTION

This invention combines both of these approaches to produce a signal display which reduces operator fatigue. This permits longer watches, greater accuracy, and more effective search for mines and marine salvage.

The device and method of the invention provides an improved echo detection and ranging system that is characterized by an improved echo classification system. This system permits a selection of a predetermined object size to which the system will respond to the exclusion of objects of either a larger or smaller size. The system also has circuitry which will sound an audio alarm to accompany the display of a signal return from an object of the predetermined size.

The signal classification is accomplished by comparing the size of adjacent lobes of the spectrum of returned echo pulses, as will be more completely explained herein. An audio alarm is also provided which will be triggered by the presence of an echo signal of a predetermined size. As will be more fully discussed herein, the system of the invention permits selection of operating conditions to produce a high signal to noise ratio without loss of target resolution or increase of reverberation.

Accordingly, it is an object of the present invention to provide an improved echo ranging system.

A further object of the invention is the provision of an improved signal analyzer for an echo ranging system.

An equally important object of the present invention is the provision of a sonar system having size responsive signal analyzer circuitry.

An accompanying object of the invention is to provide a signal analyzing display for sonar systems responsive only to signals corresponding to targets of a predetermined size.

A further object of the invention is the provision of an alarm system to indicate the presence of a predetermined echo return signal in a sonar system.

A further object of the invention is the provision of an alarm which is responsive to echo signals of a predetermined size in the video output of an echo ranging system.

A further object of this invention is the provision of an audio alarm in an echo ranging system effective to accompany a visual display of echo signals of a predetermined type.

Still another object of this invention is to provide a method and means for determining object size of a reflecting object by a wave analysis of the energy reflected therefrom.

Another object of this invention is the provision of circuitry in a sonar system to limit the response thereof to signals reflected from objects of a predetermined size.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENTS

Figure 1:
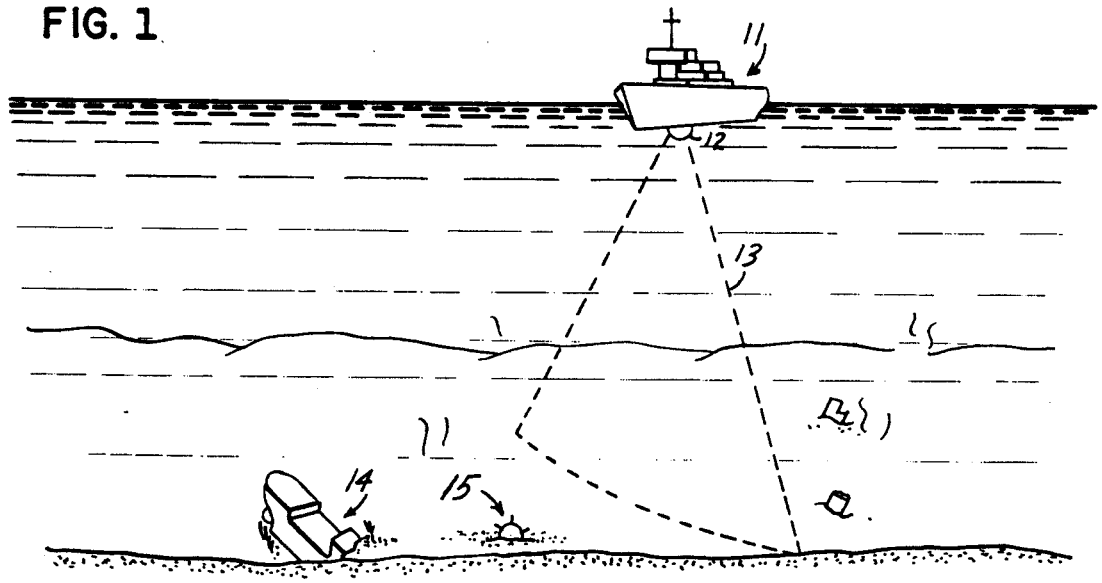
FIG. 1 shows a surface craft using the device of the invention.

Referring to FIG. 1, there is shown a surface vessel 11 having a sonar transducer dome 12 on the bottom thereof. The sonar system within vessel 11 ensonifies and receives return signals from an investigative zone 13 which extends to the bottom beneath vessel 11. As vessel 11 proceeds along its course, images of bottom objects are displayed on the readout of the sonar where they are viewed by operating personnel. Objects for which vessel 11 is searching are represented by sunken ship 14 and marine mine 15.

Although vessel 11 is illustrated as a conventional surface ship, it is obvious that this is in no way a limitation on the ranging system of the invention. Other applications may suggest other enclosing and operating environments, particularly submarine vessels and offshore stationary platforms have been contemplated in addition to the surface vessel use. Likewise, other shapes of investigative patterns than shown by pattern 13 may be used without departing from the scope of the invention.

Before discussing the circuit configuration of the preferred embodiment, it will be beneficial to propaedeutically describe the theory of signal propagation and return upon which the system of the invention operates.

Figure 2:
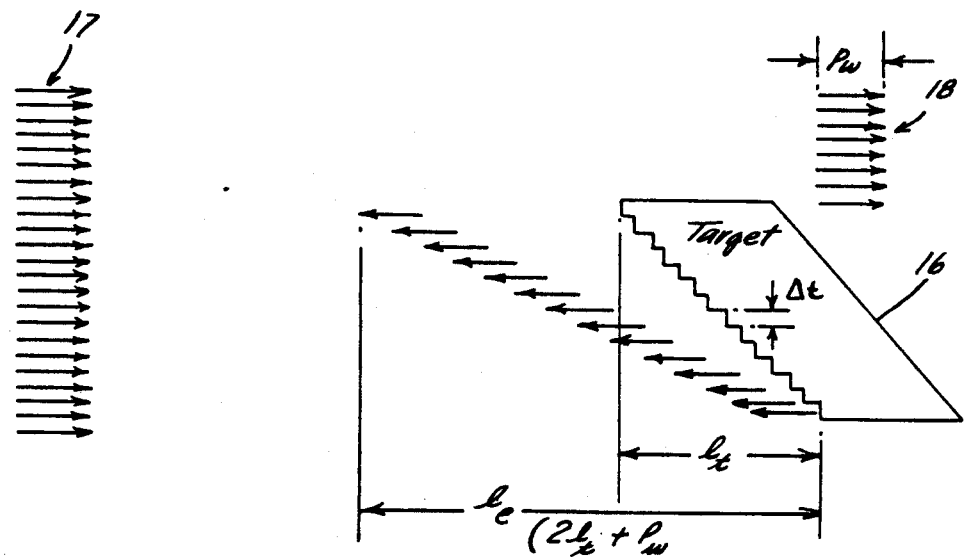
FIG. 2 illustrates the pulse width broadening effect of pulses impinging a target.

Referring to FIG. 2 target 16 is shown in the propagation path of waves 17 and 18 of acoustic energy. Acoustic energy waves 16 and 17 are represented by a plurality of vectors representing the pulse width pw. Target 16 is angularly disposed with respect to the direction of propagation such that it has a length, denoted $l_t$, along the direction of propagation. Incremental sections, $\Delta t$, of the target reflect the impinging portion of the acoustic wave back toward the source. A portion of wave 18 is shown as having been reflected, while wave 17 is shown still approaching the target.

Considering now the portion of wave 18 which has been reflected, it will be observed the nearest portion of the target reflects a portion of the wave while the portion of the wave to be ultimately reflected from the remote portions is still traveling foreward. Therefore, the reflection from the nearest point of the target have traveled the target length, $l_t$, before wave 18 impinges the most remote point on target 16. The result of this is that the length of the echo return, $l_e$, is twice the target length, $l_t$, plus one pulse width, pw.

Figure 3:
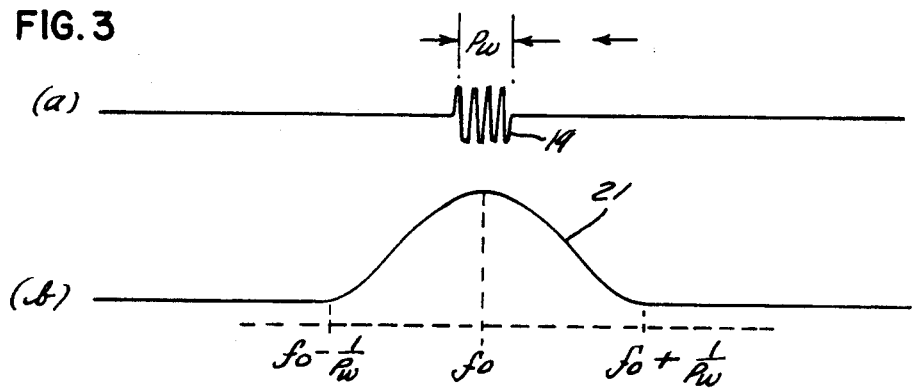
FIG. 3 indicates the frequency spectrum of a single pulse of wave energy.

Referring now to FIG. 3a, there is shown waveform 19 which represents one pulse of acoustic energy. FIG. 3b shows the spectral distribution curve 21 of the pulse of FIG. 3a. It may be seen that for a pulse having a frequency of $f_o$ the frequency is confined to the range between $f_o-1/pw$ and $f_o+1/pw$. It may be seen that the spectral distribution is a function of the pulse width.

Figure 4:
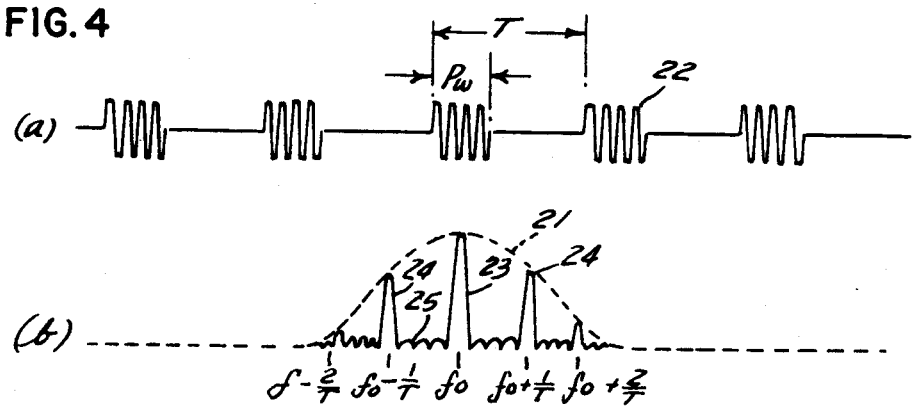
FIG. 4 indicates the frequency spectrum of a train of pulses of the type shown in FIG. 3.

Referring to FIG. 4a, waveform 22 illustrates a train of pulses having the same pulse width as the single pulse of waveform 19. The individual pulses of waveform 22 are separated by a recurrence interval T. FIG. 4b illustrates the spectral distribution curve of waveform 22 and shows a major central lobe 23 at $f_o$ and major side lobes 24 spaced therefrom at frequencies related to the recurrence interval T. Minor side lobes 25 occur between the major lobes 23 and 24, but are of no interest in the present invention.

It will be noted that the major lobes are related to each other in height in such a fashion as to preserve the shape of spectral distribution curve 21, shown imposed thereon as a broken line. It follows, therefore, that the relative height of the major lobes of a spectral distribution of a pulse train is determined by the pulse width of the component pulses of the pulse train. The width of the major lobes are inversely related to the number of pulses in the train. The spacing of major lobes, one from the other, is a function of the pulse recurrence interval, shown as T in FIG. 4a. The spacing is given by the formula:

$$F_L = F_o \pm N/T$$

where
FL is the frequency of the lobe;
$F_o$ is the carrier or oscillator frequency;
N is successive integers denoting the number of the side band; and
T is the pulse recurrence interval.

The side lobes are named "upper" and "lower" by convention.

The pulse values denote upper side lobe frequencies and the minus values denote lower side lobe frequencies.

Figure 5:
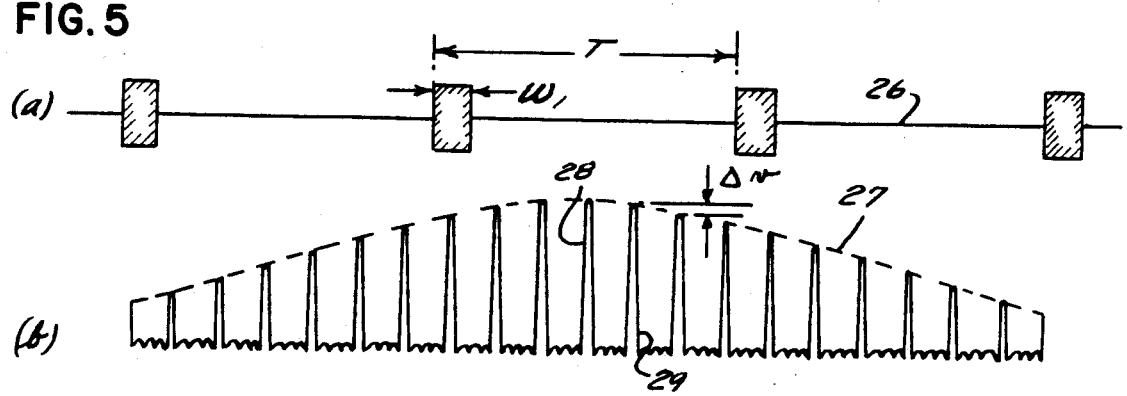
FIG. 5 illustrates the spectrum of a train of pulses.
Figure 6:
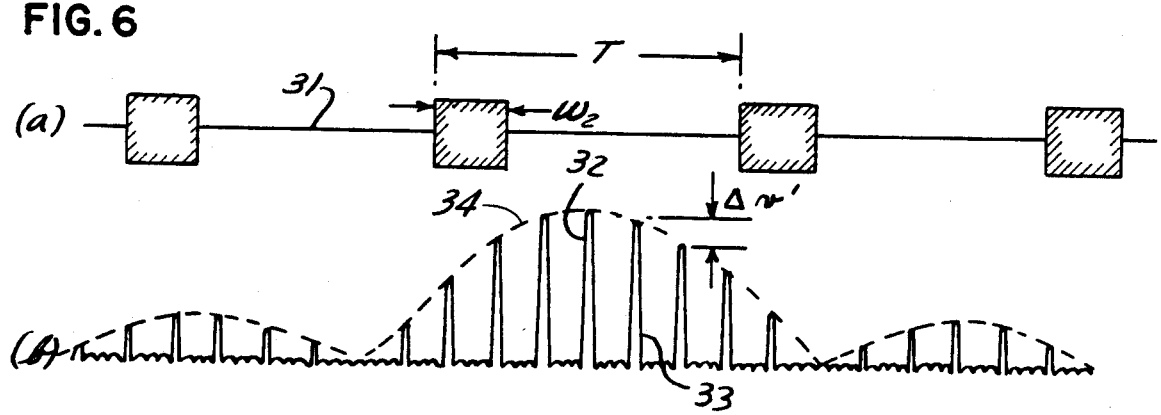
FIG. 6 illustrates the frequency spectrum of an echo from the pulse train of FIG. 5 which has been doubled in pulse width.
Figure 7:
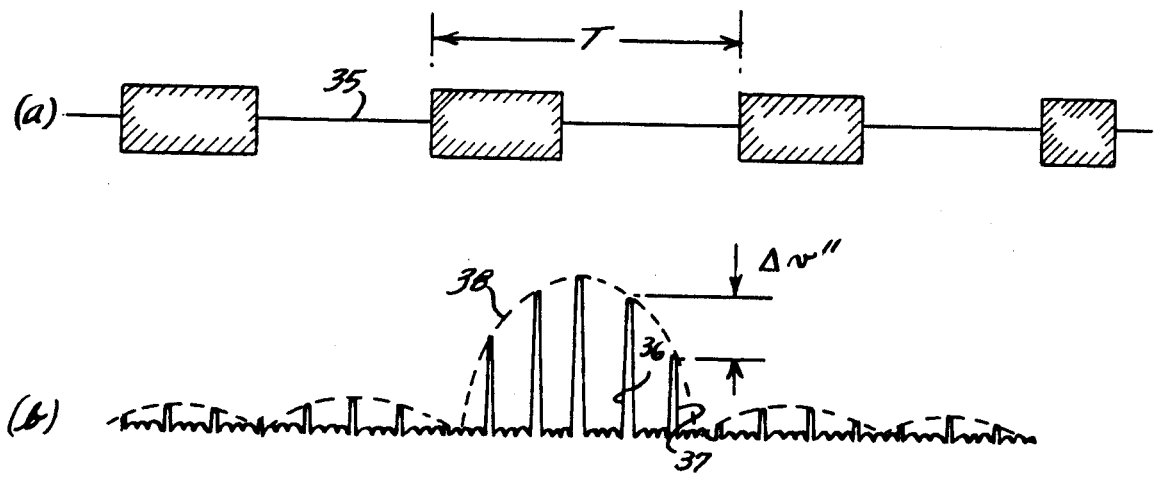
FIG. 7 shows the frequency spectrum of the pulse train of FIG. 5 which has had the pulse width thereof quadrupled in length.

Referring now to FIGS. 5 through 7, it will be seen how this phenomenon is related to a pulsed sonar signal. FIG. 5a shows waveform 26 representing a transmitted pulsed acoustic target search signal, which, for purpose of explanation, may be considered to have a pulse width ($W_1$) of one half millisecond and some convenient repetition rate T. FIG. 5b shows the frequency spectrum of the pulse portion of acoustic signal waveform 26. This frequency spectrum is a voltage-frequency plot of the pulse and has a relatively long envelope 27, shown by broken lines. Envelope 27 results in a small difference, indicated as $\Delta v$, in voltage obtained by first side lobe 28 and second side lobe 29. If, as indicated, waveform 26 corresponds to the transmitted acoustic signal of a sonar system, FIG. 5b represents the spectral distribution of the signal corresponding to no target encountered or acquired.

FIG. 6a shows the echo signal, waveform 31, arising from said transmitted signal 26 striking and reflecting from an object having a target length of approximately 0.3 meters. It will be observed that the pulse width ($W_2$) has increased to nearly double that of the transmitted pulse. Such increase in pulse width has caused the reflected signal to have a different spectral distribution than the transmitted energy, as shown at FIG. 6b. As may be seen, echo signal envelope 34 has steeper slope to the sides thereof, such that the first and second side lobes 32 and 33 have a greater difference, $\Delta v'$, than side lobes 28 and 29 in the transmitted signal. Further, it will be noted that the recurrence interval T is unaffected by reflection and, therefore, the respective locations of the side lobes remain unaltered.

FIG. 7a shows waveform 35 which exhibits the pulse width expansion resulting from reflection from a target approximately 1.1 meters in length. FIG. 7b, the corresponding spectral distribution, shows a correspondingly greater voltage difference, $\Delta v''$, between first side lobe 36 and second side lobe 37 as a result of the steeper sloped envelope 38.

As may be seen from the foregoing, the difference in voltage between adjacent side lobe pulses, $\Delta v$, $\Delta v'$, and $\Delta v''$ in the illustrated examples, is related to the target size along the direction of travel of the impinging energy. In a sonar system used in salvage, minehunting and similar operations, the direction of propagation is essentially downward and the indicated size is the vertical direction or height of the object off the bottom.

Likewise, the foregoing discussion is limited to adjacent side lobes of a higher frequency than the central frequency but the same relationship obviously exist with other side lobes, including nonadjacent side lobes and those of lower frequencies.

Figure 8:
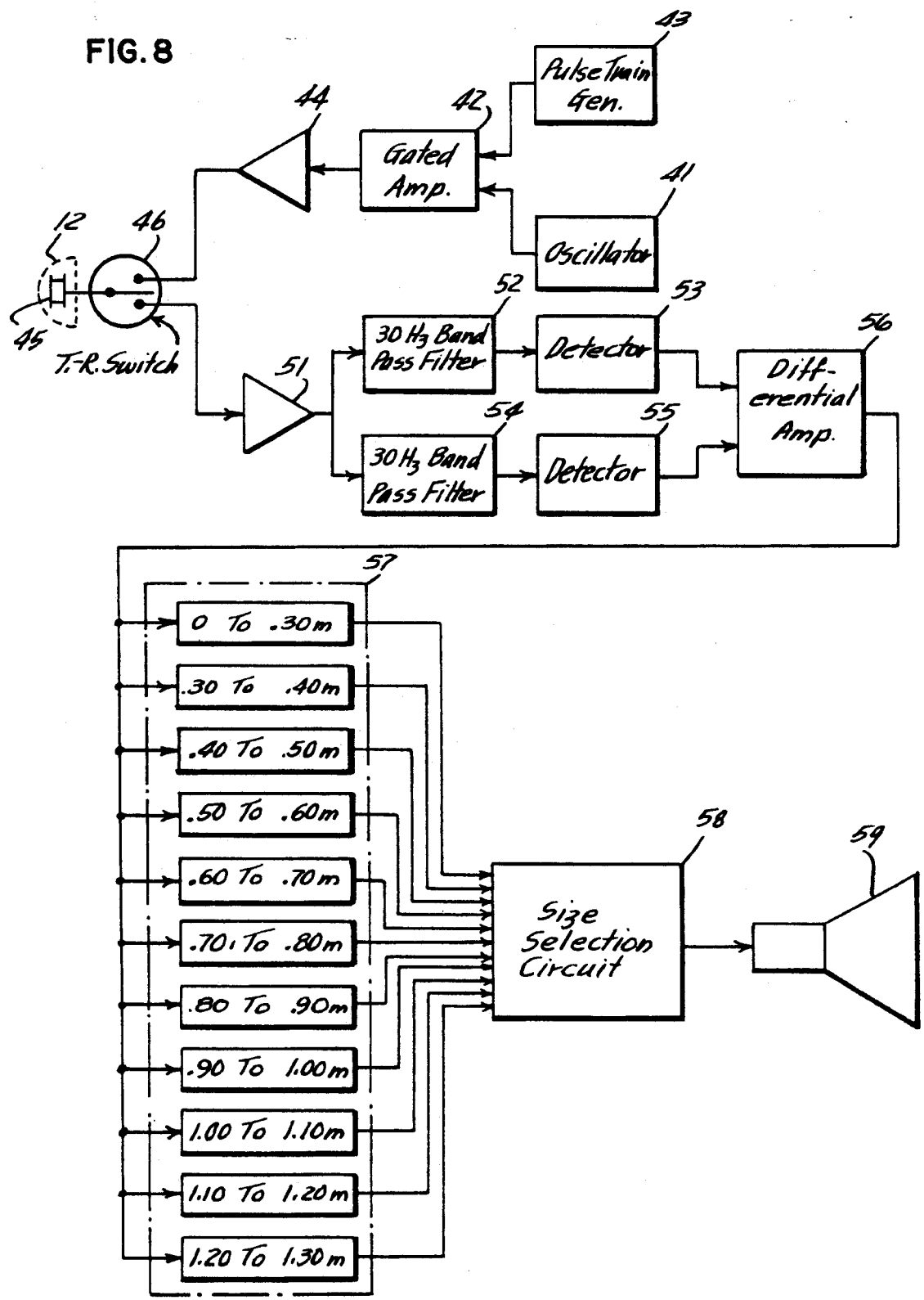
FIG. 8 shows, in block diagram form, a sonar system according to the invention.

Referring to FIG. 8, a preferred embodiment of the system is diagrammatically shown. Oscillator 41 is connected to one input of gated amplifier 42. Oscillator 41 is a free running oscillator whose output is of a suitable frequency for a sonar carrier signal, thirty kilohertz for example. The other input to gated amplifier 42 is connected to pulse train generator 43.

Pulse train generator 43 provides a gating pulse to shape the transmitted signal of the sonar system. For example, a pulse train thirty milliseconds long and having a five millisecond pulse repetition interval between one-half millisecond pulses will produce spectral distributions similar to that shown in FIGS. 5b, 6b, and 7b. This pulse train corresponds to the single pulse of conventional systems and is repeated at the ping-listen cycle rate that the particular search situation requires.

Pulse train generator 43 and gated amplifier 42 together comprise the modulator means of the system.

The output of gated amplifier 42 is connected to power amplifier 44. The power of the pulsed sine wave signal is increased by power amplifier 44 which has its output connected to transducer 45, located within sonar dome 12, via transmit-receive switch 46. Transmit-receive switch 46, hereafter referred to as T-R switch 46, connects transducer 46 to the aforedescribed transmitter section of the system during transmit periods and to the receiver portion of the system, to be presently described in greater detail, during listen portions.

It is, of course, possible to employ separate electroacoustic transducers forthe transmit and receive functions in the invention, if desired. If such an optional arrangement is used, T-R switch 46 may be dispensed with and its changeover function performed by a blanking pulse generator so as to disable the receiver during the transmit interval and the reverberation period immediately there following. Such substitutions are within the scope of a proficient electroacoustic artisan who is skilled in the ranging arts.

During listening periods, transducer 45 is connected to amplifier 51 via T-R switch 46. The level of the output signal of transducer 45 is increased linearly by amplifier 51, which may comprise a plurality of individual stages of electrical amplification. The output of amplifier 51 is connected to two receiver channels, and may be connected to the indicator, if desired, as will be more completely explained in connection with FIG. 7.

The first receiver channel is comprised by filter 52 and detector 53. Filter 52 is a thirty hertz bandpass filter centered on the frequency of the first side lobe. For purposes of explanation, the operating frequency may be considered to be 200 hertz above the acoustic frequency, i.e., 30.2 Khz, which corresponds closely with the abovedescribed operational parameters. Other operating frequencies may, of course, be required if the operating frequency or pulse repetition frequency is altered. The output from filter 52 is connected to detector 53 which has an output voltage corresponding to the pulse height of the first side lobe signal passed thereto by filter 52.

The second channel is similar to the first channel except for operating frequency. That is, filter 54 is connected to amplifier 51 to receive the output therefrom and has its output connected to detector 55. The frequency of filter 54 is chosen to center its passband on the second side lobe of the returned signal, or in the aforedescribed example 400 hertz above the operating frequency, i.e., 30.4 KHz. The output of detector 55 is therefore a voltage corresponding to the height of the second side lobe.

It may be readily seen from the foregoing that the two outputs from detectors 53 and 55 contain the information necessary to determine the target length in the direction of signal propagation, termed herein "target size". These detectors have their outputs connected to the inputs of differential amplifier 56. The output of differential amplifier 56 is connected to voltage comparator 57.

Voltage comparator 57 comprises a plurality of voltage responsive gates which pass voltages of a predetermined range and excludes voltages outside that range. The output of voltage comparator 57 is a plurality of channels each corresponding to an output of one of the voltage gates and, therefore, to targets having an associated target size. The outputs of voltage comparator are connected to size selection circuit 58.

Size selection circuit 58, as the name implies, is used to select the particular output channel corresponding to the target size which is desired to be displayed. The output of size selection circuit 58 is connected to cathode ray tube display 59 for the visual display of the selected signals. In the illustrated arrangement of FIG. 8, the signal from voltage comparator 57 is the signal displayed on cathode ray tube display 59 and size selection circuit 58 may be simply a switch.

Rather than display the side lobe voltage derived signal it may be desired to display the actual target return. A size selection circuit 58 to perform this function, as well as sound an accompanying audio alarm is shown in FIG. 9.

Figure 9:
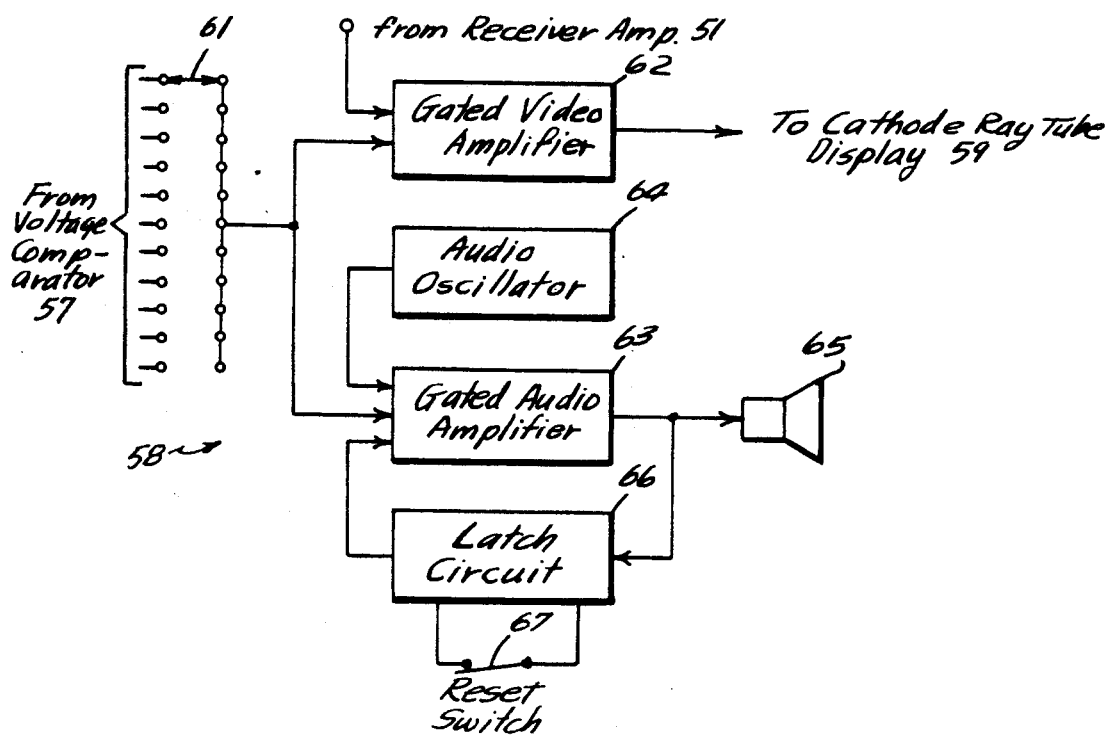
FIG. 9 shows how a circuit element of FIG. 8 may be configured in one embodiment of the invention.

Referring to FIG. 9, multi-position switch 61 is shown as receiving the inputs from voltage comparator 57 and connecting a selected one thereof to gated video amplifier 62 and to gated audio amplifier 63. These signals are used as gating signals for both amplifiers 62 and 63.

Amplifier 62 is also connected to amplifier 51, FIG. 8, so as to receive the output thereof unfiltered by either filter 52 or 54. When a signal is coupled to amplifier 62 it is gated open to amplify the returned signal. The output of amplifier 62 is connected to cathode ray tube display 59. Upon receiving a signal of the selected size, cathode ray tube display 59 will then display the actual received target signal.

Because the attention of the operator may be diverted elsewhere at the time of the display, an alarm is provided by the circuit of FIG. 9 to accompany the display. Audio oscillator 64 is connected to an input of gated audio amplifier 63 so as to supply an audio signal thereto. Upon receiving a gate signal from switch 61, amplifier 63 applies the amplified audio signal to a loudspeaker 65, or other electroacoustic transducer, to which it is connected. A latch circuit 66, which may be simply a relay, keeps the audio alarm sounding until gated amplifier 63 is turned off by reset switch 67.

The aforedescribed circuitry comprises a simplified system, however, in more complex arrangements size selection circuit 58 may include computer-like logic functions to analyze the returns from all channels of voltage comparator 57. Such an arrangement may perform, for example, a continuous analysis of the sea bottom so as to display and sound alarms for returns from a target size distribution outside the statistical average of the adjacent bottom area. Such a display system is very useful in salvage and minehunting. Consider, for example, the case of a salvage vessel attempting to locate a sunken vessel, such as ship 14, FIG. 1. If the size acceptance is restricted to the size of ship 14 itself, salvage vessel 11 may make passes quite close to the ship without discovering the wreck. However, a computer making continual analysis of bottom returns could display the deck and tween space cargo and other debris which litter the wreck area alerting the salvage vessel that they are in the vicinity of the wreck.

It is well understood that the speed at which wrecks are located add greatly to the salvage value and pollution control effectiveness. Therefore, the value of the invention in those situations is obvious.

MODE OF OPERATION

The operation of the device of the invention, as shown in FIG. 1, will be discussed with reference to the embodiment which incorporates the size selection circuitry of FIG. 9. The circuit is energized and transducer 45 is connected by T-R switch 46 to amplifier 44 so as to radiate compressional wave energy of a frequency determined by oscillator 41. The compressional wave energy is pulsed at a rate determined by pulse train generator 43, so as to produce the desired side lobe width and separation.

After a sufficient time interval to assure the decay of volume reverberation, T-R switch 46 connects transducer 45 to receiver amplifier 51 to amplify the signals produced by echo returns of the compressional wave energy striking transducer 45. The output of amplifier 51 is fed to spectral analyzer circuitry, in the illustrated arrangement filters 52 and 54, where the amplitude of two selected side lobes is detected. In the embodiment shown in FIG. 1 and described above this is accomplished by detectors 53 and 55.

The difference in amplitude of the two selected side lobes is amplified to a desired value. In the illustrated embodiment the obtaining of the difference and amplification thereof is obtained by differential amplifier 56.

The amplified difference signal is classified to determine what voltage difference exists between the two side lobes. As discussed above, this voltage difference is indicative of the target extent along the direction of propagation of the acoustic energy.

In the preferred embodiment described this voltage is classified by voltage comparator 57. The output of voltage comparator 57 is a plurality of channels each corresponding to a predetermined range of sizes. Having effectively broken the signal into a plurality of signal channels each corresponding to a target size range, the outputs thereof are fed to a utilization device to perform the desired target information processing.

In the illustrated and described embodiment, the system is configured to display only signals from a selected size target. Considering the circuitry of FIG. 9 used to accomplish this objective, it may be seen that switch 61 is positioned to connect a selected output from signal comparator 57 to two gated amplifiers to provide the gating signals therefor. Gated video amplifier 62 is connected to receive the signal output from amplifier 51. The output of gated video amplifier therefore amplifies the received signal when it is gated "on". This, of course, corresponds to the reception of a target of a certain size as determined by the position of switch 61. Other signals which arrive without the coincident gate pulse are not passed by gated video amplifier. The output of gated video amplifier 61 is displayed by cathode ray tube 59.

An audio oscillator 64 is used to produce an alarm signal which is connected to gated audio amplifier 63 to be similarly passed thereby to speaker 65 when a gate pulse is received from switch. Latch circuit 66 keeps gated audio amplifier 63 "on" so as to assure the signal is heard by operating personnel who may reset the alarm signal by means of a reset switch 67 when they have responded to the alarm.

The foregoing description of the preferred embodiment taken with its described mode of operation and the claims appended hereto constitute a disclosure such as to enable persons who are skilled in the echo ranging arts and having the benefit of the teachings contained therein to make and use the invention. Further, the structure and method herein described meet the objects of invention and generally constitute meritorious advances in the art which remain unobvious to such a skilled worker not having the benefit of the teachings contained herein.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An improved echo ranging system comprising in combination:
    oscillator means for establishing an electrical signal having a desired frequency;
    modulator means connected in electrical circuit with said oscillator means for shaping said oscillator electrical output signal into a pulse train of predetermined length comprising a plurality of individual pulses having a predetermined pulse recurrence interval and a much longer pulse train repetition rate;

power amplifier means connected in electrical circuit with said modulator means for increasing the power output thereof;

transducer means positioned to communicate with a predetermined medium to radiate energy therein and receive reflected energy therefrom and effectively electrically connected to said power amplifier means for converting said amplified pulse train signals into pulses of wave energy to be radiated into said predetermined medium and converting echo returns of wave energy into echo electrical signals;

receiver means effectively connected to said transducer means for amplification of said echo electrical signals;

spectral analyzer means electrically connected to said receiver means so as to receive said amplified echo signals therefrom and to separate said signals into selected component side lobe signals;

circuit means connected to said spectral analyzer means so as to receive said side lobe signals therefrom for generating a difference signal related to the difference in amplitude in said selected side lobe signals;

voltage comparator means electrically connected to said circuit means so as to receive said difference signal therefrom for comparing said difference signal with a known voltage;

signal selection means connected in circuit with said voltage comparator means so as to receive the output therefrom for selecting output signals having predetermined voltage characteristics; and display means connected to said signal selection means so as to receive said selected signals therefrom for displaying a visual signal in response to the receipt of said selected signals.

2. An improved echo ranging system according to claim 1 in which said signal selection means further comprises gated video amplifier means connected to said receiver means so as to receive echo signals therefrom and connected in circuit so as to receive said signals having predetermined voltage characteristics as gating signals for passing amplified echo signals to said display means in responsive to said gating signals having predetermined voltage characteristics.

3. An improved echo ranging system according to claim 2 wherein said signal selection means additionally comprises in combination:

audio oscillator means for producing an audio frequency electrical signal;

gated audio amplifier means connected to said audio oscillator so as to receive said audio frequency electrical signal therefrom and connected in circuit was to receive said signals having predetermined voltage characteristics as gating signals therefor for producing an amplified audio signal output in response to said gating signal; and electroacoustic transducer means connected to said gated audio amplifier so as to receive said amplified audio signal therefrom for producing an audible signal to accompany the display of the aforesaid amplified echo signals.

4. An improved echo ranging system according to claim 1, said circuit means comprising:

a plurality of detector means each connected in circuit with said spectral analyzer means for detecting the amplitude of a single selected side lobe signal; and differential amplifier means electrically connected in circuit with said plurality of detector means so as to receive the detected amplitude signals therefrom for producing an output which is the difference in amplitude of said detected side lobe signals.

5. An improved echo ranging system according to claim 1 in which said voltage comparator comprises a plurality of voltage responsive gate circuits having their individual inputs connected in parallel and their individual outputs comprising separate channels.

6. An improved echo ranging circuit according to claim 1 in which said signal selection means further comprises an audio alarm which is activated by said output signals having predetermined voltage characteristics.

7. An improved echo ranging system according to claim 1 in which said spectral analyzer comprises a plurality of narrow band pass filters for passing only selected side lobe frequencies.

8. An improved echo ranging system according to claim 7 wherein said filters are centered on a frequency determined by the frequency of said oscillator means and the pulse recurrence interval of said modulator means for centering the passband thereof on the frequency of major side lobes.

* * * * *